(12) United States Patent
Amedick et al.

(10) Patent No.: US 8,616,015 B2
(45) Date of Patent: Dec. 31, 2013

(54) COOLING CIRCUIT FOR REMOVING WASTE HEAT FROM AN ELECTROMECHANICAL CONVERTER AND POWER GENERATING PLANT WITH A COOLING CIRCUIT OF THIS TYPE

(75) Inventors: Volker Amedick, Duisberg (DE); Malte Blomeyer, Müheim an der Ruhr (DE); Leandro Cravero, Müheim an der Ruhr (DE); Eberhard Deuker, Mülheim an der Ruhr (DE); Hendrik Heitfeld, Gladbeck (DE); Carsten Kaufmann, Mülheim a.d. Ruhr (DE); Meinolf Klocke, Witten (DE); Stefan Völker, Moers (DE)

(73) Assignee: Siemens Aktiengesellschaft, München (DE)

( * ) Notice: Subject to any disclaimer, the term of this patent is extended or adjusted under 35 U.S.C. 154(b) by 441 days.

(21) Appl. No.: 12/821,261

(22) Filed: Jun. 23, 2010

(65) Prior Publication Data

US 2010/0326110 A1  Dec. 30, 2010

(30) Foreign Application Priority Data

Jun. 26, 2009 (EP) .................................. 09008408

(51) Int. Cl.
  *F25B 27/00* (2006.01)
(52) U.S. Cl.
  USPC ............. 62/238.3; 165/58; 62/112; 361/700; 60/728; 60/597

(58) Field of Classification Search
  USPC .................. 62/238.3, 478, 481, 112; 165/58; 60/278; 361/700
  See application file for complete search history.

(56) References Cited

U.S. PATENT DOCUMENTS

| | | | |
|---|---|---|---|
| 3,394,555 A * | 7/1968 | La Fleur | 62/643 |
| 6,024,792 A | 2/2000 | Kurz et al. | |
| 6,321,552 B1 * | 11/2001 | Frederiksen | 62/238.3 |
| 7,441,589 B2 * | 10/2008 | Garrabrant et al. | 165/58 |
| 8,146,384 B2 * | 4/2012 | Ryu et al. | 62/476 |
| 2003/0016499 A1 * | 1/2003 | Tanaka et al. | 361/700 |
| 2008/0178590 A1 * | 7/2008 | Chillar et al. | 60/597 |
| 2009/0097205 A1 * | 4/2009 | Matsushima et al. | 361/700 |
| 2010/0275648 A1 * | 11/2010 | Mazumder et al. | 62/645 |
| 2010/0326098 A1 * | 12/2010 | Rog et al. | 62/101 |
| 2011/0056219 A1 * | 3/2011 | Avery et al. | 62/79 |

FOREIGN PATENT DOCUMENTS

| | | |
|---|---|---|
| DE | 3726493 A1 | 2/1989 |
| DE | 19541915 A1 | 1/1997 |
| DE | 10214183 C1 | 5/2003 |
| EP | 0412397 B1 | 2/1991 |
| EP | 0486489 B1 | 5/1992 |

(Continued)

*Primary Examiner* — Frantz Jules
*Assistant Examiner* — Meraj A Shaikh (57) ABSTRACT

A cooling circuit for removing waste heat from a cooling device of an electromechanical converter is provided. The cooling circuit includes a chilling medium, a cooler for extracting heat from the chilling medium, a return connecting the cooling device of the converter to the cooler and conducts warm chilling medium, a feed connecting the cooler to the cooling device of the converter and conducts cool chilling medium, and an absorption chiller for extracting heat from the chilling medium. The absorption chiller is driven by the heat of the warm chilling medium that is in the return.

11 Claims, 4 Drawing Sheets

(56) References Cited

FOREIGN PATENT DOCUMENTS

| | | | |
|---|---|---|---|
| EP | 0786017 | B1 | 7/1997 |
| EP | 0892090 | | 1/1999 |
| EP | 1204776 | B1 | 5/2002 |
| EP | 1306454 | A1 | 5/2003 |
| EP | 1319729 | A1 | 6/2003 |
| JP | 2004012102 | A | 1/2004 |
| WO | WO 9967435 | | 12/1999 |
| WO | WO 0044949 | | 8/2000 |

\* cited by examiner

COOLING CIRCUIT FOR REMOVING WASTE HEAT FROM AN ELECTROMECHANICAL CONVERTER AND POWER GENERATING PLANT WITH A COOLING CIRCUIT OF THIS TYPE

CROSS REFERENCE TO RELATED APPLICATIONS

This application claims priority of European Patent Office application No. 09008408.8 EP filed Jun. 26, 2009, which is incorporated by reference herein in its entirety.

FIELD OF INVENTION

The present invention relates to a cooling circuit for removing waste heat from an electromechanical converter, for instance an electric motor and in particular a generator. The invention also relates to a power generating plant with a turbine, a generator and a cooling circuit for removing waste heat from the generator.

BACKGROUND OF THE INVENTION

The energy market today is growing so rapidly that, for example, gas turbine power generating plants sometimes already fail to satisfy the planned requirement on the day they are delivered. A quick subsequent increase in the output of the power generating plant can be obtained in principle by means of retrofitting the gas turbine. It is quite possible in this way to achieve increases in output of up to 20%. However, the increases in output must be adapted to the component of the lowest design rating, i.e. the component allowing the lowest increase in output, with the result that this component restricts the increase in output that is possible in a gas turbine power generating plant by retrofitting. This component is generally the generator, the copper temperatures of which form the limit for the increase in output obtained by retrofitting.

It is possible to lower the copper temperature of the generator by cooling. This may be achieved, for example, by cooling the generator inlet air, but also possible is a cooling circuit for the generator, in which a cooling device of the generator is supplied with cooled water, which absorbs heat there that is later extracted again from the heated water before it is returned to the cooling device. Such a cooling circuit is described, for example, in US 2008/0178590 A1. In it, the cooling of the heated water takes place either by an absorption chiller, which is driven by heated compressor air, exhaust gas of the gas turbine or steam of a steam turbine, or by a mechanical cooler, that is to say a cooler that is based on a mechanical compression process and is driven by electricity generated by the generator.

In particular if the heat for driving the absorption chiller is extracted from the compressor air or the steam of a steam turbine, this heat extraction must be taken into account when planning the management of the turbine. An extraction of electrical energy from the generator for driving a mechanical compressor reduces the possible useful output of the generator.

SUMMARY OF INVENTION

An object of the present invention is to provide an advantageous cooling circuit for an electromechanical converter, such as for instance a generator or an electric motor. A further object of the present invention is to provide an advantageous power generating plant.

The first object is achieved by a cooling circuit as claimed in the claims, the second object is achieved by a power generating plant as claimed in the claims. The dependent claims contain advantageous configurations of the invention.

A cooling circuit according to the invention for removing waste heat from a cooling device of an electromechanical converter, such as for instance an electric motor or in particular a generator, comprises a chilling medium, a cooler for extracting heat from the chilling medium, a return connecting the cooling device of the converter to the cooler for conducting warm chilling medium, a feed connecting the cooler to the cooling device of the converter for conducting cool chilling medium and an absorption chiller, for example a water/lithium-bromide absorption chiller or an ammonia/water absorption chiller, for further extracting heat from the chilling medium. According to the invention, the absorption chiller is driven by the heat of the warm chilling medium that is in the return.

By means of the absorption chiller, which is present in addition to the cooler, the temperature of the chilling medium returned to the cooling device of the converter via the feed can be further cooled beyond the cooling in the cooler. The absorption chiller therefore increases the cooling capacity. Since this chiller is driven by the waste heat from the converter, which would in any case be lost if it were not used by the absorption chiller, it is no longer necessary to take the extracted heat into consideration, which would be the case for example if the heat were extracted from the compressor of a gas turbine, as described in US 2008/0178590 A1. There, the heat extracted from the compressor air must be taken into consideration in the gas turbine process. With the configuration according to the invention of the cooling circuit, more effective cooling of the converter is therefore possible, without intervention in the process driving the converter being necessary and without useful output of the converter having to be used for driving the chiller. Even if further heat is necessary for driving the absorption chiller in addition to the waste heat from the converter, and this waste heat has to be taken into consideration in the gas turbine process, the heat that has to be taken into consideration in the gas turbine process is reduced in comparison with the prior art.

In the cooling circuit according to the invention, an evaporator of the absorption chiller is connected in particular to the feed to absorb heat. Furthermore, a generator of the absorption chiller is connected to the return to absorb heat. The cooling of the chilling medium therefore takes place both in the feed and in the return, whereby particularly effective cooling beyond the cooling in the cooler becomes possible.

The heat supplied to the absorption chiller must of course be removed again. For this purpose, the absorption chiller comprises a cooler which is arranged between the generator and the evaporator in the direction of flow of a chilling fluid flowing in the absorption chiller. The cooler serves for cooling the chilling fluid driven out, in order in this way to bring about a condensation of the chilling fluid. The cooler may therefore also be referred to as a condenser. The cooler then removes the extracted heat, for example to the surroundings. The cooling unit of the absorption chiller may in particular also be integrated in the cooler of the cooling circuit, which may for example be a cooling tower.

A power generating plant according to the invention comprises a turbine, in particular a gas turbine, a generator and a cooling circuit according to the invention for removing waste heat from the generator. The cooling circuit according to the invention thereby makes it possible to lower the temperature of the chilling medium flowing into the generator for cooling the generator and so increases the cooling capacity. As a result, the copper temperature of the generator can be lowered further.

The reduction in the copper temperature of the generator that can be achieved with the invention makes it possible to retrofit a gas turbine plant to increase the power output, the copper temperature having less of a limiting effect than without the cooling circuit according to the invention. Furthermore, the retrofitting does not require any intervention in the gas turbine process, such as would be necessary if the heat for driving the absorption chiller were extracted from the compressor air, or at least reduced intervention. Although, as likewise described in US 2008/0178590 A1, the heat for driving the absorption chiller may also be extracted from the exhaust gas of the gas turbine, this could also influence process parameters, for example if the gas turbine were operated in combination with a steam turbine in which the waste heat from the gas turbine is used for driving the steam turbine. By contrast with this, in the present invention heat which would otherwise be uselessly lost is at least for the most part used for driving the absorption chiller, and therefore does not lead to a change in a process parameter of the power generating plant or to a reduction in the useful output.

BRIEF DESCRIPTION OF THE DRAWINGS

Other features, properties and advantages of the present invention are evident from the following description of exemplary embodiments with reference to the accompanying figures.

DETAILED DESCRIPTION OF INVENTION

Figure 1:
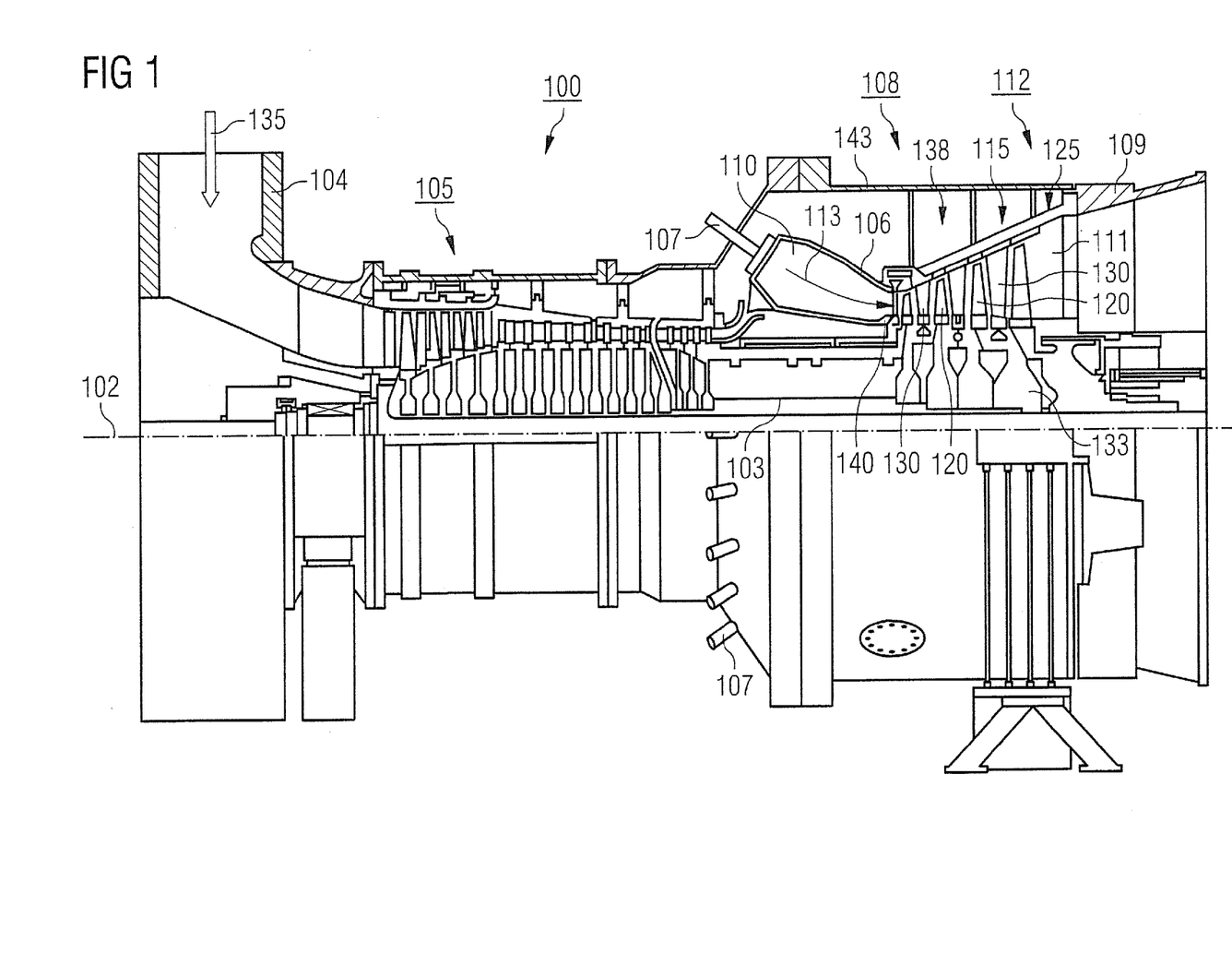
FIG. 1 shows by way of example a gas turbine in a longitudinal partial section.

FIG. 1 shows by way of example a gas turbine 100 in a longitudinal partial section.

The gas turbine 100 has in the interior a rotor 103, which is rotatably mounted about an axis of rotation 102, has a shaft 101 and is also referred to as a turbine runner.

Following one another along the rotor 103 are an intake housing 104, a compressor 105, a combustion chamber 110, for example of a toroidal form, in particular an annular combustion chamber, with a number of coaxially arranged burners 107, a turbine 108 and the exhaust housing 109.

The annular combustion chamber 110 communicates with a hot gas duct 111, for example of an annular form. There, the turbine 108 is formed for example by four successive turbine stages 112.

Each turbine stage 112 is formed for example by two blade rings. As seen in the direction of flow of a working medium 113, a row of stationary blades 115 is followed in the hot gas duct 111 by a row 125 formed by moving blades 120.

The stationary blades 130 are in this case fastened to an inner housing 138 of a stator 143, whereas the moving blades 120 of a row 125 are attached to the rotor 103, for example by means of a turbine disk 133.

Coupled to the rotor 103 is a generator or a machine (not represented).

During the operation of the gas turbine 100, air 135 is sucked in by the compressor 105 through the intake housing 104 and compressed. The compressed air provided at the end of the compressor 105 on the turbine side is passed to the burners 107 and mixed there with a fuel. The mixture is then burned in the combustion chamber 110 to faun the working medium 113. From there, the working medium 113 flows along the hot gas duct 111 past the stationary blades 130 and the moving blades 120. At the moving blades 120, the working medium 113 expands, transferring momentum, so that the moving blades 120 drive the rotor 103 and the latter drives the machine coupled to it.

The components that are exposed to the hot working medium 113 are subjected to thermal loads during the operation of the gas turbine 100. The stationary blades 130 and moving blades 120 of the first turbine stage 112, as seen in the direction of flow of the working medium 113, are thermally loaded the most, along with the heat shielding elements lining the annular combustion chamber 110.

In order to withstand the temperatures prevailing there, these may be cooled by means of a coolant.

Similarly, substrates of the components may have a directional structure, i.e. they are monocrystalline (SX structure) or only have longitudinally directed grains (DS structure).

Iron-, nickel- or cobalt-based superalloys are used for example as the material for the components, in particular for the turbine blade 120, 130 and components of the combustion chamber 110.

Such superalloys are known, for example, from EP 1 204 776 B1, EP 1 306 454, EP 1 319 729 A1, WO 99/67435 or WO 00/44949.

Similarly, the blades 120, 130 may have coatings against corrosion (MCrAlX; M is at least one element of the group comprising iron (Fe), cobalt (Co) and nickel (Ni), X is an active element and represents yttrium (Y) and/or silicon, scandium (Sc) and/or at least one element of the rare earths or hafnium). Such alloys are known from EP 0 486 489 B1, EP 0 786 017 B1, EP 0 412 397 B1 or EP 1 306 454 A1.

A thermal barrier coating may also be present on the MCrAlX, and consists for example of $ZrO_2$, $Y_2O_3$—$ZrO_2$, i.e. it is unstabilized, partially stabilized or completely stabilized by yttrium oxide and/or calcium oxide and/or magnesium oxide.

Columnar grains are produced in the thermal barrier coating by suitable coating methods, such as for example electron-beam physical vapor deposition (EB-PVD).

The stationary blade 130 has a stationary blade root (not represented here), facing the inner housing 138 of the turbine 108, and a stationary blade head, at the opposite end from the stationary blade root. The stationary blade head faces the rotor 103 and is fixed to a fastening ring 140 of the stator 143.

Figure 2:
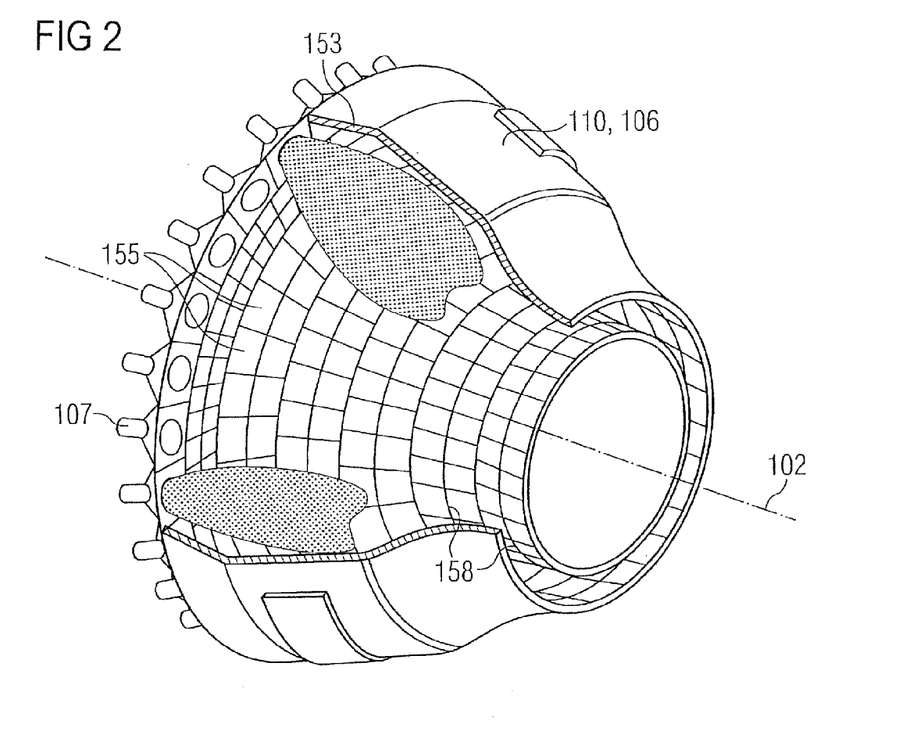
FIG. 2 shows a combustion chamber of a gas turbine.

FIG. 2 shows a combustion chamber 110 of a gas turbine. The combustion chamber 110 is designed for example as what is known as an annular combustion chamber, in which a multiplicity of burners 107, which are arranged in the circumferential direction around the axis of rotation 102, open out into a common combustion chamber space 154 and produce flames 156. For this purpose, the combustion chamber 110 is designed as a whole as an annular structure, which is positioned around the axis of rotation 102.

To achieve a comparatively high efficiency, the combustion chamber 110 is designed for a comparatively high temperature of the working medium M of approximately 1000° C. to 1600° C. To permit a comparatively long operating time even with these operating parameters that are unfavorable for the materials, the combustion chamber wall 153 is provided on its side facing the working medium M with an inner lining formed by heat shielding elements 155.

Each heat shielding element 155, made of an alloy, is provided on the working medium side with a particularly heat-resistant protective layer (MCrAlX layer and/or ceramic coating) or is produced from material that is resistant to high temperature (solid ceramic bricks).

These protective layers may be similar to the turbine blades, that is to say for example MCrAlX; M is at least one element of the group comprising iron (Fe), cobalt (Co) and nickel (Ni), X is an active element and represents yttrium (Y) and/or silicon and/or at least one element of the rare earths, or hafnium (Hf). Such alloys are known from EP 0 486 489 B1, EP 0 786 017 B1, EP 0 412 397 B1 or EP 1 306 454 A1.

A thermal barrier coating, for example of ceramic, may also be present on the MCrAlX and consists for example of $ZrO_2$, $Y_2O_3$—$ZrO_2$, i.e. it is unstabilized, partially stabilized or completely stabilized by yttrium oxide and/or calcium oxide and/or magnesium oxide.

Columnar grains are produced in the thermal barrier coating by suitable coating methods, such as for example electron-beam physical vapor deposition (EB-PVD).

Other coating methods are conceivable, for example atmospheric plasma spraying (APS), LPPS, VPS or CVD. The thermal barrier coating may have grains which are porous, are provided with microcracks or are provided with macrocracks for better thermal shock resistance.

Refurbishment means that heat shielding elements 155 may have to be freed of protective layers after use (for example by sandblasting). This is followed by removal of the corrosion and/or oxidation layers or products. If need be, cracks in the heat shielding elements 155 are then also repaired. This is followed by a recoating of the heat shielding elements 155 and renewed use of the heat shielding elements 155.

On account of the high temperatures in the interior of the combustion chamber 110, a cooling system may also be provided for the heat shielding elements 155 or for their holding elements. The heat shielding elements 155 are then for example hollow and if need be also have cooling holes (not represented) opening out into the combustion chamber space 154.

Figure 3:
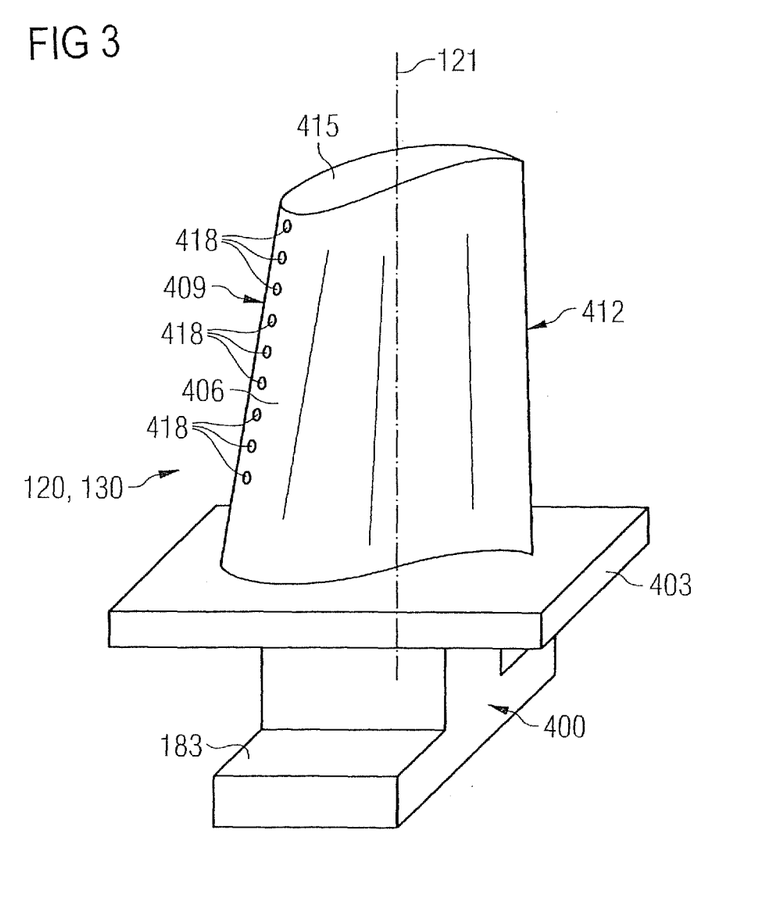
FIG. 3 shows a moving blade or a stationary blade of a turbomachine in a perspective view.

FIG. 3 shows in a perspective view a moving blade 120 or stationary blade 130 of a turbomachine, which extends along a longitudinal axis 121.

The turbomachine may be a gas turbine of an aircraft or of a power plant for generating electricity, a steam turbine or a compressor.

The blade 120, 130 has, following one after the other along the longitudinal axis 121, a fastening region 400, an adjoining blade platform 403 and also a blade airfoil 406 and a blade tip 415.

As a stationary blade 130, the blade 130 may have a further platform at its blade tip 415 (not represented).

In the fastening region 400 there is formed a blade root 183, which serves for the fastening of the moving blades 120, 130 to a shaft or a disk (not represented).

The blade root 183 is designed for example as a hammer head. Other designs as a firtree or dovetail root are possible.

The blade 120, 130 has for a medium which flows past the blade airfoil 406 a leading edge 409 and a trailing edge 412.

In the case of conventional blades 120, 130, solid metallic materials, in particular superalloys, are used for example in all the regions 400, 403, 406 of the blade 120, 130.

Such superalloys are known, for example, from EP 1 204 776 B1, EP 1 306 454, EP 1 319 729 A1, WO 99/67435 or WO 00/44949.

The blade 120, 130 may in this case be produced by a casting method, also by means of a directional solidification, by a forging method, by a milling method or combinations of these.

Workpieces with a monocrystalline structure or structures are used as components for machines which are exposed to high mechanical, thermal and/or chemical loads during operation.

The production of monocrystalline workpieces of this type takes place for example by directional solidification from the melt. This involves casting methods in which the liquid metallic alloy solidifies to form the monocrystalline structure, i.e. to form the monocrystalline workpiece, or in a directional manner.

Dentritic crystals are thereby oriented along thermal flow and form either a columnar grain structure (i.e. grains which extend over the entire length of the workpiece and are commonly referred to here as directionally solidified) or a monocrystalline structure, i.e. the entire workpiece comprises a single crystal. In these methods, the transition to globulitic (polycrystalline) solidification must be avoided, since undirected growth necessarily causes the formation of transversal and longitudinal grain boundaries, which nullify the good properties of the directionally solidified or monocrystalline component.

While reference is being made generally to directionally solidified structures, this is intended to mean both monocrystals, which have no grain boundaries or at most small-angle grain boundaries, and columnar crystal structures, which indeed have grain boundaries extending in the longitudinal direction but no transversal grain boundaries. These second-mentioned crystalline structures are also referred to as directionally solidified structures.

Such methods are known from U.S. Pat. No. 6,024,792 and EP 0 892 090 A1.

Similarly, the blades 120, 130 may have coatings against corrosion or oxidation, for example (MCrAlX; M is at least one element of the group comprising iron (Fe), cobalt (Co) and nickel (Ni), X is an active element and represents yttrium (Y) and/or silicon and/or at least one element of the rare earths, or hafnium (Hf)). Such alloys are known from EP 0 486 489 B1, EP 0 786 017 B1, EP 0 412 397 B1 or EP 1 306 454 A1.

The density is preferably 95% of the theoretical density.

A protective aluminum oxide layer (TGO=thermal grown oxide layer) forms on the MCrAlX layer (as an intermediate layer or as the outermost layer).

The composition of the layer preferably comprises Co-30Ni-28Cr-8Al-0.6Y-0.7Si or Co-28Ni-24Cr-10Al-0.6Y. Apart from these cobalt-based protective coatings, nickel-based protective coatings are also preferably used, such as Ni-10Cr-12Al0.6Y-3Re or Ni-12Co-21Cr-11Al-0.4Y-2Re or Ni-25Co-17Cr-10Al-0.4Y-1.5Re.

A thermal barrier coating which is preferably the outermost layer and consists for example of $ZrO_2$, $Y_2O_3$—$ZrO_2$, i.e. is unstabilized, partially stabilized or completely stabilized by yttrium oxide and/or calcium oxide and/or magnesium oxide, may also be present on the MCrAlX.

The thermal barrier coating covers the entire MCrAlX layer.

Column grains are produced in the thermal barrier coating by suitable coating methods, such as for example electron-beam physical vapor deposition (EB-PVD).

Other coating methods are conceivable, for example atmospheric plasma spraying (APS), LPPS, VPS or CVD. The thermal barrier coating may have grains which are porous, are provided with microcracks or are provided with macrocracks for better thermal shock resistance. The thermal barrier coating is therefore preferably more porous than the MCrAlX layer.

Refurbishment means that components 120, 130 may have to be freed of protective layers after use (for example by sandblasting). This is followed by removal of the corrosion and/or oxidation layers or products. If need be, cracks in the component 120, 130 are then also repaired. This is followed by a recoating of the component 120, 130 and renewed use of the component 120, 130.

The blade 120, 130 may be hollow or be of a solid form. If the blade 120, 130 is to be cooled, it is hollow and may also have film cooling holes 418 (indicated by dashed lines).

Figure 4:
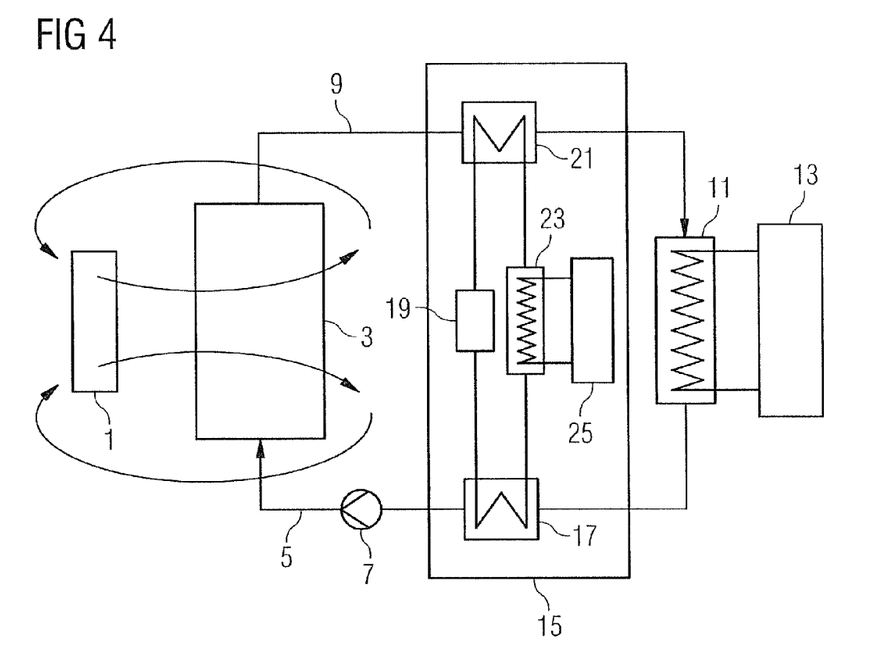
FIG. 4 shows a cooling circuit according to the invention.

A cooling circuit for the generator 1 driven by the gas turbine from FIG. 1 is represented in FIG. 4. The generator is air-filled, the heat of the air heated by the generator 1 being extracted from the air in a generator air cooler 3. The generator air cooler 3 is part of a cooling circuit for cooling the generator, in which the heat of the heated air is transferred to a chilling medium, in the present exemplary embodiment water. However, other suitable chilling media may also be used instead of water.

By means of a pump 7, which is arranged in a feed 5 and maintains the circulation of the cooling circuit, the water is pumped into the generator air cooler 3, where it absorbs the waste generator heat that is in the air. The heated water is passed via a return 9 to a cooler 11 in the form of a heat exchanger, where the heat contained in the water is given off in the present exemplary embodiment to the cooling water circuit of a cooling tower 13. The water that has been cooled again after passing through the heat exchanger 11 is finally returned by means of the pump 7 to the generator air cooler 3 via the feed 5.

In order to cool the water of the cooling circuit further, there is also an absorption chiller 15, which extracts further heat from the water. This chiller comprises a further cooling circuit with a vaporizable chilling fluid, an evaporator 17, in which the chilling fluid is evaporated by absorption of heat from the water of the feed of the cooling circuit of the generator that has already been cooled by the cooler 11, an absorber 19, in which the vapor of the chilling medium is taken up by a liquid, i.e. absorbed, and a generator 21, in which the chilling medium is driven out again, i.e. desorbed again from the liquid by which it has been absorbed in the absorber.

A heat input into the generator is necessary for driving out the chilling fluid. The heat input takes place via a heat exchanger from the water in the return 9 that has been heated by the generator air cooler. In order to bring the driven-out chilling fluid into the vaporizable state again, it is condensed in a condenser 23 by heat extraction before it is returned to the evaporator 17. The heat of condensation occurring during the condensation in the condenser 23 is given off to the surroundings by means of a further cooling circuit 25. In particular, the cooling tower 13 already mentioned may also be used here.

Water may be used for example as the chilling fluid and lithium bromide may be used for example as the absorbing liquid. However, other combinations of chilling fluid and absorbing liquid are also possible, for example ammonia as the chilling fluid and water as the absorbing liquid.

By means of the absorption chiller 15, the water that is in the cooling circuit for generator cooling is cooled further by two processes. On the one hand, the warm water in the return 9 is cooled by the chilling fluid of the absorption chiller absorbing heat during the driving out. On the other hand, the water that is in the feed 5, which has already been cooled by the heat exchanger 11, is cooled by the chilling fluid absorbing heat from the water during the evaporation in the evaporator 17.

The absorption chiller therefore cools the water in the cooling circuit, the heat that is necessary for driving the absorption chiller likewise being taken from the cooling circuit and therefore leading to further cooling of the water that is in the cooling circuit. In the event that the heat that is in the water of the return 9 is not adequate for reliably operating the generator 21, the latter can be supplied with heat from an additional heat source, for example heat from the exhaust gas of the gas turbine.

With the cooling circuit according to the invention, more heat can be extracted from the generator cooling air in the generator air cooler 3 than in the case of a circuit without an absorption chiller, with the result that the cooling air used for generator cooling has a lower cold gas temperature. This allows the copper temperature during the operation of the generator to be lowered, whereby in turn potential is obtained for increasing the output of the generator, and consequently of the gas turbine driving the generator. In particular, it is also possible to install the absorption chiller subsequently in an existing generator cooling circuit, with the result of extending the scope for increasing the output of the gas turbine plant in the course of an upgrade.

The invention claimed is:

1. A cooling circuit for removing waste heat from a cooling device of an electromechanical converter, comprising:
   a chilling medium;
   the cooling device of the converter, wherein heat is extracted by the cooling device of the converter from air heated by the electromechanical converter and transferred to the chilling medium;
   a cooler for extracting heat from the chilling medium;
   a return, connecting the cooling device of the converter to the cooler for conducting the warmed chilling medium;
   a feed, connecting the cooler to the cooling device of the converter for conducting the cooled chilling medium; and
   an absorption chiller, which is present in addition to the cooler, for extracting further heat from the chilling medium,
   wherein the absorption chiller is driven by the heat of the warmed chilling medium that is in the return,
   wherein the absorption chiller comprises an evaporator and a generator,
   wherein the evaporator is connected to the feed to absorb heat from the cool chilling medium in the feed,
   wherein the generator is connected to the return to absorb heat, and
   the chilling medium which is water or ammonia extracts heat from the air heated by the electromechanical converter and then the heated chilling medium through the return passes through the generator to give heat input to the generator then the chilling medium leaving the generator is cooled in the cooler before entering the evaporator to evaporate the fluid within the absorption chiller by absorption of heat from the feed of the chilling medium and then finally the chilling medium is returned by a pump to the cooling device of the converter via the feed through the cooler and then the evaporator.

2. The cooling circuit as claimed in claim 1, wherein the absorption chiller is a water/lithium-bromide absorption chiller.

3. The cooling circuit as claimed in claim 1, wherein the absorption chiller is an ammonia/water absorption chiller.

4. The cooling circuit as claimed in claim 1, wherein the absorption chiller further comprises a cooling unit, which is arranged between the generator and the evaporator in a direction of flow of a chilling fluid flowing in the absorption chiller.

5. The cooling circuit as claimed in claim 4, wherein the cooling unit of the absorption chiller is integrated in the cooler of the cooling circuit.

6. A power generating plant, comprising:
a turbine;
a generator; and
a cooling circuit for removing waste heat from the generator, the cooling circuit, comprising:
a chilling medium,
a cooler for extracting heat from the chilling medium,
a return, connecting a cooling device of a converter to the cooler for conducting a warm chilling medium,
a feed, connecting the cooler to the cooling device of the converter for conducting a cool chilling medium, and
an absorption chiller, which is present in addition to the cooler, for extracting further heat from the chilling medium,
wherein the absorption chiller is driven by the heat of the warm chilling medium that is in the return,
wherein the absorption chiller comprises an evaporator and a further generator,
wherein the evaporator is connected to the feed to absorb heat from the cool chilling medium in the feed,
wherein the further generator is connected to the return to absorb heat, and
the chilling medium which is water or ammonia extracts heat from the air heated by the electromechanical converter and then the heated chilling medium through the return passes through the generator to give heat input to the generator then the chilling medium leaving the generator is cooled in the cooler before entering the evaporator to evaporate the fluid within the absorption chiller by absorption of heat from the feed of the chilling medium and then finally the chilling medium is returned by a pump to the cooling device of the converter via the feed through the cooler and then the evaporator.

7. The power generating plant as claimed in claim 6, wherein the turbine is a gas turbine.

8. The power generating plant as claimed in claim 6, wherein the absorption chiller is a water/lithium-bromide absorption chiller.

9. The power generating plant as claimed in claim 6, wherein the absorption chiller is an ammonia/water absorption chiller.

10. The power generating plant as claimed in claim 6, wherein the absorption chiller further comprises a cooling unit, which is arranged between the generator and the evaporator in a direction of flow of a chilling fluid flowing in the absorption chiller.

11. The power generating plant as claimed in claim 10, wherein the cooling unit of the absorption chiller is integrated in the cooler of the cooling circuit.

* * * * *